(12) United States Patent
Ddamulira et al.

(10) Patent No.: US 7,799,895 B2
(45) Date of Patent: Sep. 21, 2010

(54) LOW VOC BIO-SOURCE ADHESIVE

(75) Inventors: Robert Kintu Ddamulira, Chattanooga, TN (US); John Edmund Raidy, Jr., Pasadena, CA (US); Barry Kenneth Wright, Rosewell, GA (US)

(73) Assignee: W.F. Taylor Co., Inc., Fontana, CA (US)

( * ) Notice: Subject to any disclaimer, the term of this patent is extended or adjusted under 35 U.S.C. 154(b) by 903 days.

(21) Appl. No.: 11/520,404

(22) Filed: Sep. 12, 2006

(65) Prior Publication Data
US 2008/0064852 A1 Mar. 13, 2008

(51) Int. Cl.
*C09F 5/02* (2006.01)
(52) U.S. Cl. ...................................... 530/211; 530/215
(58) Field of Classification Search ................. 530/211, 530/215
See application file for complete search history.

(56) References Cited

U.S. PATENT DOCUMENTS

| 6,201,066 B1* | 3/2001 | Ito et al. ...................... 525/120 |
| 2002/0095007 A1 | 7/2002 | Larock et al. |
| 2003/0073765 A1* | 4/2003 | Ddamulire et al. .......... 524/115 |

* cited by examiner

*Primary Examiner*—Robert D. Harlan
(74) *Attorney, Agent, or Firm*—Stroock & Stroock & Lavan LLP

(57) ABSTRACT

A one component adhesive composition is provided, which can be formulated from substantially or totally bio-based, renewable raw materials. Such adhesives can be formulated to have high strength and/or low or substantially no VOC emissions. This can be achieved by utilizing polymers that are derived or extracted from renewable plant materials such as soybeans, corn, sunflowers, wheat, etc. Adhesive compositions in accordance with the invention can include oils. The composition preferably contains bio-based oils only, but need not be completely free of fossil fuel or synthetic based oils. It should also include drying oils and/or similarly acting polymers, co-polymers, and fatty acids. Plasticizers, such as hydrogen oxide, derived from renewable sources are utilized to impart performance properties to the formulated adhesive. Metal napthanates can be used to catalyze the drying and/or curing speed when the adhesive composition is applied to a substrate.

27 Claims, 1 Drawing Sheet

LOW VOC BIO-SOURCE ADHESIVE

BACKGROUND OF THE INVENTION

Figure 1:
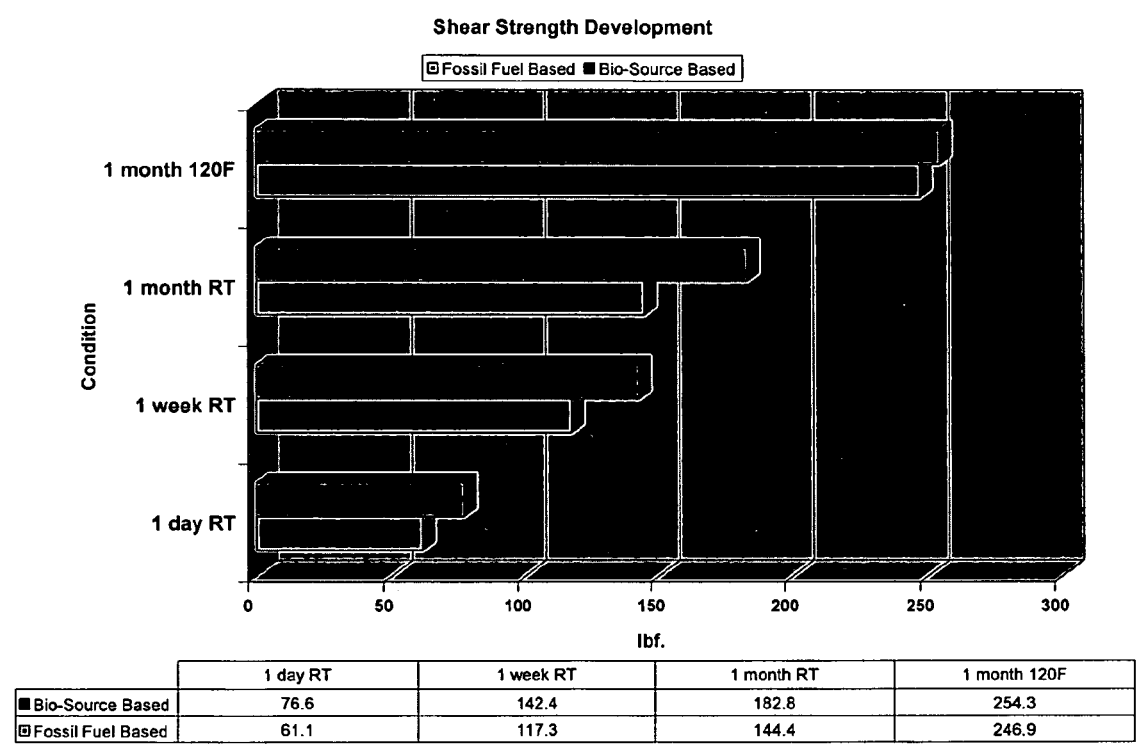

The invention relates generally to adhesive compositions and methods of making adhesives, such as flooring adhesives. In particular, the invention relates to adhesives that are manufactured using renewable bio-based (green) raw materials and those that have low emissions of undesirable materials, such as volatile organic compounds (VOCs).

Many products are assembled using adhesives. For example, various flooring products made from wood, vinyl, tile, carpet and so forth are permanently adhered to a surface or substrate through the use of an adhesive. Commonly used adhesives include those sold under the trademarks Taylor Envirotec 2090 Vinyl Adhesive and Taylor Envirotec 2055 Premium Carpet Adhesive, sold by W.F. Taylor Co. of Fontana, Calif.

Currently, most floor covering adhesives are made using fossil fuel based raw materials, which can be costly and cause environmental concerns. For example, many solvent-based adhesives emit volatile organic compounds (VOCs). Depending on the working environment, available ventilation, and the amount of adhesive to be used, some consider the VOCs and other emitted chemicals to be disadvantageous. There are other reactive adhesives such as moisture cure urethanes that exhibit emission problems because they give off solvents and other potentially dangerous materials such as isocyantes (MDI and TDI).

Accordingly, it is desirable to provide an improved adhesive that overcomes drawbacks and inadequacies of the prior art.

SUMMARY OF THE INVENTION

Generally speaking, in accordance with the invention, a one component adhesive composition is provided, which can be formulated from substantially or totally bio-based, renewable raw materials. Such adhesives can be formulated to have high strength and/or low or substantially no VOC emissions. This can be achieved by utilizing polymers that are derived or extracted from renewable plant materials such as soybeans, corn, sunflowers, wheat, etc.

Adhesive compositions in accordance with the invention can include oils. The composition preferably contains bio-based oils only, but needs not be completely free of fossil fuel or synthetic based oils. It should also include drying oils and/or similarly acting polymers, co-polymers, and fatty acids. Plasticizers or fluidizing agents derived from renewable sources are utilized to impart performance properties to the formulated adhesive. Metal napthanates can be used to catalyze the drying and/or curing speed when the adhesive composition is applied to a substrate.

Adhesives in accordance with the invention can also include various tackifying rosins, particularly wood rosins and gum rosins having a softening point in the range 70° C. to 140° C. These can be dissolved or otherwise mixed in the drying oil component. For example, gum rosins and wood rosins, preferably both, mixed in effective proportions to provide desired cured strength, green strength, open working times and so forth can be satisfactory.

High strength construction adhesives in accordance with the invention can be particularly useful in assembling various flooring products made from wood, vinyl, ceramic, rubber to various substrates common to flooring installations including: concrete, plywood, underlayment grade particle board, vinyl, ceramic tile, cement patches and underlayments, radiant heat flooring and terrazzo.

Accordingly, it is an object of the invention to provide an improved adhesive using ingredients from renewable sources and/or an adhesive that emits reduced VOCs.

Another object of the invention is to provide an improved method of making an adhesive.

Still other objects of the invention will in part be obvious and will, in part, be apparent from the specification. The invention accordingly comprises the composition of matter, the method of making a composition of matter and the method of using the composition of matter which will be exemplified in the compositions and methods hereinafter described, and the scope of the invention will be indicated in the claims.

DETAILED DESCRIPTION OF THE DRAWINGS

For a fuller understanding of the invention, reference is had to the following description taken in connection with the accompanying drawing, in which:

FIG. 1 is a graph showing the comparative results of the shear strength development in various durations and conditions of bio-based adhesive and fossil fuel-based adhesive.

DETAILED DESCRIPTION OF THE PREFERRED EMBODIMENTS

The invention is directed to adhesive compositions and methods of making adhesive compositions which can include ingredients set forth below. As will be evident to those of ordinary skill in the art, substitutions, omissions and additions will be possible in order to provide adhesives with customized selected properties.

Recent advances in agro-genetic engineering and natural fiber development offer significant opportunities for new, improved green raw materials from renewable resources that are biocompatible and biodegradable thereby enhancing global sustainability. Examples of such materials include cellophane (cellulose based), cellulose derivatives such as cellulose esters, engineered wood products, biofiber composites, polylactic acid (PLA) Polymer from corn, starch foams, soybean based biodiesel and lubricants.

Utilization of the free energy of sunlight to grow materials by photosynthesis helps remove global warming gases such as $CO_2$ and reduces the dependence and use of depleting fossil fuels.

Preferred ingredients, preferred percentages of components in accordance with preferred embodiments of the invention are set forth in the Table 1 below:

TABLE 1

| | Preferred Ingredient | Preferred Amount wt % | Preferred Process |
|---|---|---|---|
| 1 | Drying Oils such as Linseed Oil, Tung Oil, Sunflower Oil, Blown and Heated-bodied Oil, | 15 to 30 | |

TABLE 1-continued

| Preferred Ingredient | Preferred Amount wt % | Preferred Process |
|---|---|---|
| Cashew Shell Oil, Castor Oil, Coconut Oil, Cotton Seed Oil, Fish Oil, Oiticica Oil, Rapeseed Oil, Safflower Oil, Sesame Oil, Soybean Oil, Walnut Oil, Synthetic Oils, Tall Oil, Fatty Acids, or any blend of the above. | | |
| 2 Wood or Gum Rosin. This may be combined with the following at low percentages: Aliphatic C-5 Hydrocarbon Resin with a softening point of between about 75° and 115° C., such as that produced from Acyclic Aliphatic monomers such as Cis 1, 3 Pentadiene, Trans 1, 3 Pentadiene, 2-Methyl 2 Butene, Alkylated Aromatic C-9 Resin with a softening point of between about 100° and 140° C., produced from C-8 to C-10 monomers such as Styrene, Vinyl Toluene, Indene, Methyl Indene, Alpha Methyl Styrene. | 10 to 20 | Ingredients 2 are combined with Ingredient 1. Temperatures of between about 240° and 300° F. may be required to form a substantially homogenous solution. This homogenous solution should be held at between about 250° and 260° before being combined with the ingredients below. |
| 3 Surfactants, such as 6 to 10 mole ethoxylates of nonylphenols and other emulsifying agents such as saponified esters. | 0.50 to 1.50 | Add ingredients 3 and 4 to ingredient 6 while mixing until uniform. |
| 4 Anti-foaming agents such as non-silicon anti-foaming agents | 0.05 to 0.10 | |
| 5 Polymers derived from plant and animal renewable sources with carboxyl, acrylic, methacrylate, epoxide functionality, such as acrylated epoxidized soybean oil polymers (AESO), maleinized soybean oil monoglyceride (SOMG), soy proteins, acrylated oleic methyl ester (AOME), polylactic acid (PLA), etc. These can be combined (at low levels) with synthetic polymer emulsions, such as Acrylic, Styrene Butadiene, EVA, VAE | 10 to 60 | Maintain the temperature of ingredient 5 to between 60° and 90° F. Add ingredients 3 and 4 while mixing until uniform. Then add the premixed ingredients 1, and 2 above to ingredient 6 with high shear agitation until ingredients form a homogenous emulsion. |
| 6 Plasticizer from renewable sources such as hydrogen oxide | 20 to 50 | Add while agitating |
| 7 Fugitive alkali agent, such as Ammonia, MEA, TEA | 0.10 to 1.00 | Use the alkali to adjust the above emulsion pH to between 8–10 before adding ingredients 9 and 10 |
| 8 Dispersing Agent, such as salts of polyacrylic acid and phosphates etc. | 0.10 to 1.00 | Add while agitating |
| 9 Napthanates of metals such as cobalt, calcium, zirconium, and manganese | 0.10 to 1.00 | Add while agitating |
| 10 Fillers such as Calcium Carbonate, Kaolin Clay, Mica, Talc, Silica etc. | 20 to 40 | Add slowly with high shear agitation |

The drying oil component can be included, about 5 to 40%, preferably 10 to 35%, more preferably about 15% to 30%, by weight of the total composition. The drying oil component can help to achieve the desired viscosity. It can also serve as a plasticizer and solvent to incorporate some of the solid ingredients.

Adhesives in accordance with the invention can also include tackifying rosins, particularly rosins having a softening point in the range of 70° C. to 140° C. Wood and gum rosins are examples of such rosins. The rosins are selected to give the cured adhesive the desired amount of cured strength. Appropriate selection of rosins also affects the uncured strength (initial shear strength) of the adhesive, often referred to as green strength. For example, if the adhesive is used as flooring adhesive, it is desirable that the uncured adhesive maintain the applied flooring in place with reasonable security so that tiles, for example, can be aligned properly and so that minor bumps and nudges do not require reseating and realignment of the flooring materials.

It has been determined that the cured strength and green strength of the adhesive can be related to the softening points of the resin material. As used herein, softening point will refer to the temperature at which viscous flow of a material that does not have a definite melting point changes to plastic flow.

Rosins in accordance with preferred embodiments of the invention generally have softening points between 70° C. and 140° C. By mixing rosins with different softening points, advantageous characteristics of each rosin can be realized.

A plasticizer or fluidizing agent from renewable sources, such as hydrogen oxide, can also be included, advantageously in the range of 10 to 45% by weight, advantageously 20 to 35%. The plasticizer provides tack and adhesion properties to help bind the components to each other as well as to the surface of the area under construction.

Surfactants, such as 6 to 10 mole ethoxylates of nonylphenols can be included, advantageously in the range of less than 5% by weight, advantageously 0.5 to 1.5%.

It can also be advantageous to include anti-foaming agents, in particular, non-silicon anti-foaming agents. These are advantageously included at less than about 0.5 weight percent, preferably 0.05 to 0.10 weight percent.

Adhesives in accordance with the invention can also advantageously include polymers derived from plant and animal renewable sources, particularly those having carboxyl, acrylic, methacrylate, epoxide functionality, such as acrylated epoxidized soybean oil polymers (AESO), maleinized soybean oil monoglyceride (SOMG), soy proteins, acrylated oleic methyl ester (AOME), polylactic acid (PLA), to provide enhanced adhesive properties. The polymers can be advantageously included between 1 to 80 weight percent, preferably 10 to 60 weight percent.

Compositions in accordance with the invention can also advantageously include fugitive alkali agents, such as ammonia, monomethanol amine (MEA) and triethanolamine (TEA). This alkali agent can be useful to adjust the pH. The invention can include up to 2%, preferably 0.1 to 1% of fugitive alkali agent.

Adhesive compositions in accordance with the invention can also include up to 2%, preferably 0.1 to 1% dispersing agents, such as salts of polyacrylic acids and dryers, in particular napthanates of metals, such as cobalt, calcium, zirconium and manganese. The dispersing agent can also include phosphates, such as tetrasodium pyrophosphate (TSPP). The dryers should be included in an effective amount to catalyze the drying speed of the drying oil to a desired rate. The precise amount will depend on both the desired speed of cure and the particular composition of the adhesive.

Adhesive compositions in accordance with the invention can also include effective amounts of fillers, such as calcium carbonate, kaolin clay, mica powder, talc and so forth. Fillers should generally represent less than 50% of the composition, preferable in the range of 20-40% of the composition. If too much filler is included the cohesive strength of the product can be reduced. If too little filler is included, the solids content will be too low for many applications.

A non-limiting example composition is below listed in Table 2, including a preferred process of making such example composition.

TABLE 2

| | Preferred Ingredient | Preferred Amount wt % | Preferred Process |
|---|---|---|---|
| 1 | Soybean Oil | 15.50 | |
| 2 | Wood or Gum Rosin. | 10.8 | Ingredients 2 are combined with Ingredient 1. Temperatures of between about 240° and 300° F. may be required to form a substantially homogenous solution. This homogenous solution should be held at between about 250° and 260° before being combined with the ingredients below. |
| 3 | Surfactants, such as 6 to 10 mole ethoxylates of nonylphenols and other emulsifying agents such as saponified esters. | 0.50 | Add ingredients 3 and 4 to ingredient 6 while mixing until uniform. |
| 4 | Anti-foaming agents such as non-silicon anti-foaming agents | 0.08 | |
| 5 | Polymers derived from plant and animal renewable sources with carboxyl, acrylic, methacrylate, epoxide functionality, such as acrylated epoxidized soybean oil polymers (AESO), maleinized soybean oil monoglyceride | 10.32 | Maintain the temperature of ingredient 5 to between 60° and 90° F. Add ingredients 3 and 4 while mixing until uniform. Then add the premixed ingredients 1, and 2 above to ingredient 6 with high shear agitation until ingredients form a homogenous emulsion. |

TABLE 2-continued

| | Preferred Ingredient | Preferred Amount wt % | Preferred Process |
|---|---|---|---|
| | (SOMG) etc. These can be combined (at low levels) with synthetic polymer emulsions, such as Acrylic, Styrene Butadiene, EVA, VAE | | |
| 6 | Plasticizer from renewable sources such as hydrogen oxide | 29.7 | Add while agitating |
| 7 | MEA | 0.80 | Use the alkali to adjust the above emulsion pH to between 8–10 before adding ingredients 9 and 10 |
| 8 | TSSP | 0.10 | Add while agitating |
| 9 | Napthanates of metals such as cobalt, calcium, zirconium, and manganese | 0.20 | Add while agitating |
| 10 | Kaolin Clay | 32.0 | Add slowly with high shear agitation |

Using the example adhesive set forth in Table 2, shear strengths of traditional fossil fuel-based adhesives and bio-source based adhesives in accordance with the invention are recorded at various times and temperatures. The results are recorded in FIG. 1. As can be seen from FIG. 1, bio-source adhesives in accordance with the invention can enjoy high shear strength compared with traditional fossil fuel based adhesives.

It will thus be seen that the objects set forth above, among those made apparent from the preceding description, are efficiently attained, and, since certain changes may be made in carrying out the above method and in the compositions set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

Particularly it is to be understood that in said claims, ingredients or compounds recited in the singular are intended to include compatible mixtures of such ingredients wherever the sense permits.

What is claimed is:

1. An uncured adhesive composition, comprising the combination produced by combining a polymer component comprising a polymer derived from a plant or animal source, with carboxyl, acrylic, methacylate or epoxide functionality; and a curing component effective to convert the uncured adhesive composition to a cured adhesive, wherein the polymer component comprises polylactic acid.

2. An uncured adhesive composition, comprising the combination produced by combining a polymer component comprising a polymer derived from a plant or animal source, with carboxyl, acrylic, methacylate or epoxide functionality; and a curing component effective to convert the uncured adhesive composition to a cured adhesive, comprising a rosin component.

3. An uncured adhesive composition, comprising the combination produced by combining a polymer component comprising a polymer derived from a plant or animal source, with carboxyl, acrylic, methacylate or epoxide functionality; and a curing component effective to convert the uncured adhesive composition to a cured adhesive, comprising a drying oil component.

4. An uncured adhesive composition, comprising the combination produced by combining a polymer component comprising a polymer derived from a plant or animal source, with carboxyl, acrylic, methacylate or epoxide functionality; and a curing component effective to convert the uncured adhesive composition to a cured adhesive, comprising a fugitive alkali agent.

5. An uncured adhesive composition, comprising the combination produced by combining a polymer component comprising a polymer derived from a plant or animal source, with carboxyl, acrylic, methacylate or epoxide functionality; and a curing component effective to convert the uncured adhesive composition to a cured adhesive, comprising a dispersing agent.

6. An uncured adhesive composition, comprising the combination produced by combining a polymer component comprising a polymer derived from a plant or animal source, with carboxyl, acrylic, methacylate or epoxide functionality; and a curing component effective to convert the uncured adhesive composition to a cured adhesive, wherein the adhesive composition is formulated to substantially reduce VOC emissions during curing.

7. An uncured adhesive composition, comprising the combination produced by combining a polymer component comprising a polymer derived from a plant or animal source, with carboxyl, acrylic, methacylate or epoxide functionality; and a curing component effective to convert the uncured adhesive composition to a cured adhesive, wherein the adhesive composition is formulated with substantially no component derived from a fossil fuel.

8. The adhesive composition of claim 3, wherein the polymer component comprises acrylated epoxidized soybean oil polymers.

9. The adhesive composition of claim 2, wherein the polymer component comprises maleinized soybean oil monoglyceride.

10. The adhesive composition of claim 8, wherein the polymer component further comprises maleinized soybean oil monoglyceride.

11. The adhesive composition of claim 7, wherein the polymer component comprises soy proteins.

12. The adhesive composition of claim 5, wherein the polymer component comprises acrylated oleic methyl ester.

13. The adhesive composition of claim 7, wherein the polymer component comprises about 10-60% by weight of the composition.

14. The adhesive composition of claim 8, wherein the polymer component comprises about 10-60% by weight of the composition.

15. The adhesive composition of claim 5, wherein the polymer component comprises about 10-60% by weight of the composition.

16. The adhesive composition of claim 2, wherein the rosin component comprises wood or gum rosins.

17. The adhesive composition of claim 2, wherein the rosin component has a softening point between about 70° C. to 140° C.

18. The adhesive composition of claim 2, comprising aliphatic C-5 hydrocarbon resin having a softening point between about 75° C. and 115° C.

19. The adhesive composition of claim 2, comprising alkylated aromatic C-9 resin having a softening point between about 100° C. and 140° C.

20. The adhesive composition of claim 2, comprising aliphatic D-5 hydrocarbon resin and aromatic C-9 resin.

21. The adhesive composition of claim 3, wherein the drying oil component comprises at least one member selected from the group consisting of linseed oil, tung oil or sunflower oil.

22. The adhesive composition of claim 3, wherein the drying oil component comprises at least one member selected from the group consisting of cashew shell oil, castor oil, coconut oil, cotton seed oil, fish oil, oiticica oil, rapeseed oil, safflower oil, sesame oil, soybean oil, walnut oil, tall oil or fatty acids.

23. The adhesive composition of claim 3, wherein the drying oil component comprises about 1-40% by weight of the composition.

24. The adhesive composition of claim 4, wherein the fugitive alkali agent comprises a member selected from the group consisting of ammonia, monoethanol amine or triethanol amine.

25. The adhesive composition of claim 5, wherein the dispersing agent comprises a salt of polyacrylic acid and phosphates.

26. The adhesive composition of claim 5, comprising a metal napthanate.

27. The adhesive composition of claim 26, wherein the metal is selected from the group consisting of cobalt, calcium zirconium and manganese.

* * * * *